United States Patent
Yoshikawa et al.

[11] Patent Number: 5,464,901
[45] Date of Patent: Nov. 7, 1995

[54] CURABLE RESIN COMPOSITION COMPRISING A SILICONE RESIN HAVING EPOXY AND PHENYL GROUPS IN THE MOLECULE AND A VINYL POLYMER HAVING A GROUP REACTIVE WITH THE EPOXY GROUP

[75] Inventors: Yuji Yoshikawa, Annaka; Mitsuhiro Takarada, Takasaki, both of Japan

[73] Assignee: Shin-Etsu Chemical Co., Ltd., Tokyo, Japan

[21] Appl. No.: 210,401

[22] Filed: Mar. 18, 1994

[30] Foreign Application Priority Data

Mar. 19, 1993 [JP] Japan .................................. 5-085729

[51] Int. Cl.$^6$ .................................................. C08L 83/04
[52] U.S. Cl. .................................................. 525/103; 525/100
[58] Field of Search .................................. 525/100, 101, 525/103

[56] References Cited

U.S. PATENT DOCUMENTS

| | | | |
|---|---|---|---|
| 4,614,766 | 9/1986 | Schimmel et al. | 525/104 |
| 4,818,790 | 4/1989 | Ooka et al. | 525/103 |
| 5,051,473 | 9/1991 | Tabuchi et al. | 525/100 |
| 5,066,720 | 11/1991 | Ohsughi | 525/100 |
| 5,087,286 | 2/1992 | Fukuda et al. | 106/287.16 |
| 5,280,098 | 1/1994 | Witucki et al. | 528/17 |

FOREIGN PATENT DOCUMENTS

| | | |
|---|---|---|
| 61-60748 | 3/1986 | Japan . |
| 62-187749 | 8/1987 | Japan . |
| 1139653 | 6/1989 | Japan . |

*Primary Examiner*—Ralph H. Dean
*Attorney, Agent, or Firm*—Lowe, Price, LeBlanc & Becker

[57] ABSTRACT

A curable resin composition comprises (A) a silicone resin having epoxy and phenyl groups and at least two hydrolyzable silyl groups and/or silanol groups in one molecule, (B) a vinyl polymer having a group or groups reactive with the epoxy group in the ingredient (A), and (C) a condensation catalyst for the silicone resin.

8 Claims, No Drawings

CURABLE RESIN COMPOSITION COMPRISING A SILICONE RESIN HAVING EPOXY AND PHENYL GROUPS IN THE MOLECULE AND A VINYL POLYMER HAVING A GROUP REACTIVE WITH THE EPOXY GROUP

BACKGROUND OF THE INVENTION

1. Field of the Invention

This invention relates to a curable resin composition which is capable of yielding a cured film which is resistant to acid and exhibits a good appearance.

2. Description of the Prior Art

As studies on the influence of acid rain have been prosecuted, it has been found that acid rain not only presents an ecological problem, but also adversely influences coatings, such as for motor vehicles, for which good appearance is required. More particularly, acrylic resins have been usually employed as coatings of motor vehicles wherein melamine resins are used as a curing agent for the acrylic resins. It has been found that the melamine resins are very susceptible to hydrolysis with acid rain.

For the past several years, novel types of coating materials have been developed and applied as a topcoating for motor vehicles in place of acrylic-melamine resin compositions in order to cope with the problem caused by acid rain. For instance, Japanese Laid-open Patent Application No. 1-139653 proposes a curing coating composition which comprises a carboxyl group-containing acrylic resin and an epoxy resin or which comprises a carboxyl group-containing acrylic resin and an epoxy group-containing acrylic resin. Moreover, there have been proposed in Japanese Laid-open Patent Application Nos. 62-187749 and 61-60748 curing coating compositions comprising carboxyl group-containing resins or amino group-containing resins and γ-glycidopropyltrialkoxysilanes.

As is known in the art, the mechanism of curing between carboxyl and epoxy groups has been extensively studied. In fact, this curing system ensures a good acid resistance and has been recently put into practice in place of melamine curing systems. The curing reactions between the carboxyl group-containing acrylic resins and γ-glycidopropyltalkoxysilanes include further reactions with siloxanes in addition to the above-mentioned reaction between the carboxyl and epoxy groups.

In general, the surfaces wetted with acid rain become more acidic during the course of drying. The cured coating products obtained through the above curing reaction mechanisms have not been accepted as having a satisfactory resistance to acid rain.

SUMMARY OF THE INVENTION

It is accordingly an object of the invention to provide a curable resin composition which can yield a cured film or coating or product which is resistant to acid and has a good appearance.

It is another object of the invention to provide a cured coating or film obtained from the composition.

The above objects of the invention can be achieved, according to the invention, by a curable resin composition which comprises:

(A) a silicone resin having epoxy and phenyl groups and at least two hydrolyzable silyl and/or silanol groups in the molecule;

(B) a vinyl polymer having at least one group reactive with the epoxy group of the silicone resin; and (C) a condensation catalyst for the hydrolyzable groups of the silicone resin, wherein the silicone resin and the vinyl polymer are present in such amounts that the epoxy group in the silicone resin is in the range of 0.2 to 10 equivalents per unit equivalent of the at least one group reactive with the epoxy group and the condensation catalyst is present in an amount of from 0.005 to 5 wt % of the silicone resin.

The invention is based on the finding that combinations of acrylic resins having a carboxyl group or an carboxylic anhydride group and silicone resins having both an epoxy group and a hydrolyzable silyl group or silanol group are able to yield cured products having very good physical properties including an acid resistance. When phenyl groups are further introduced into the silicone resin, good miscibility between the silicone resin and acrylic resin is attained, enabling one to coat the composition uniformly on substrates thereby providing a cured coating with good appearance. Since the silicone resin is used, a high siloxane crosslinkage density is attained. In addition, the silicone resin is cured through the silyl or silanol groups by means of the curing catalyst, so that a high acid resistance is ensured.

DETAILED DESCRIPTION AND EMBODIMENTS OF THE INVENTION

The ingredient (A) in the composition of the invention is a silicone resin which has epoxy and phenyl groups and at least two hydrolyzable silyl and/or silanol groups in the molecule. Such silicone resins are preferably those of the following general average formula $$R^1_a R^2_b R^3_c R^4_d SiO_{4-(a+b+c+d)/2}$$

wherein $R^1$ represents an epoxy group-containing organic group having from 6 to 14 carbon atoms, $R^2$ represents a hydrolyzable silyl group-containing organic group and/or OH group, $R^3$ represents a phenyl group, $R^4$ represents a methyl group, an ethyl group or a propyl group, and a, b, c and d are, respectively, a value to satisfy the requirements that $0<a+b+c+d\leq2$, $0<a<1.5$, $0<b<1.5$, $0<c<1.5$ and $0\leq d<1.5$.

Typical examples of the epoxy group include a glycidoxypropyl group, a 2-(3',4'-epoxycyclohexyl)ethyl group and the like. The hydrolyzable silyl group and/or silanol group may be represented by the general formula, 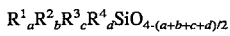 wherein $R^5$ represents a hydrogen atom or a monovalent organic group having from 1 to 10 carbon atoms such as an alkyl group, an aryl group or an aralkyl group, $R^6$ represents a hydrogen atom, a halogen atom, an alkoxy group having from 1 to 4 carbon atoms, an acyloxy group having from 2 to 4 carbon atoms, a phenoxy group, an iminoxy group or an alkenyloxy group having from 2 to 6 carbon atoms, and e is a value of 0,1 or 2.

The hydrolyzable silyl group is preferably a methoxylsilyl group or an ethoxysilyl group since these groups can be industrially mass produced. More preferably, the methoxysilyl group is used.

The phenyl group contained in the silicone resin of ingredient (A) serves to increase miscibility with the vinyl polymer used as the ingredient (B).

More particularly, if the degree of polymerization of the silicone resin is decreased, there does not arise any problem on the miscibility with vinyl polymers even when the silicone resin is free of any phenyl group. In this case, however, satisfactory siloxane crosslinkage or network cannot be formed, resulting in unsatisfactory acid resistance. On the contrary, when the degree of polymerization of the silicone resin is increased in order to ensure a high degree of siloxane crosslinkage, the miscibility between the silicone resin and the vinyl polymer is not good. These deficiencies can be overcome by introduction of phenyl groups into the silicone resin.

The silicone resin used in the present invention should preferably have a weight average molecular weight not less than 1,000 and an epoxy equivalent ranging from 300 to 5,000, more preferably from 300 to 1,000.

When the epoxy equivalent exceeds 5,000, the crosslinkage becomes unsatisfactory and adequate curing does not take place.

On the other hand, the hydrolyzable silyl group and/or silanol group should be at least two in number in the molecule and should preferably from 5 to 20 in number.

Although depending on the degree of polymerization of vinyl polymers used, the phenyl group should be favorably contained in the silicone resin in amounts not less than 3 mole %, more preferably from 5 to 50 mole % from the standpoint of the miscibility.

The silicone resins used in the invention may be readily prepared by known processes.

Typical preparation processes include a process wherein epoxy group-containing alkoxysilanes, such as γ-glycidoxypropyltrimethoxysilane, γ-glycidoxypropylmethyldimethoxysilane, β-(3,4-epoxycyclohexyl)ethyltrimethoxysilane and the like, phenyl group-containing alkoxysilanes, such as phenyltrimethoxysilane, diphenyldimethoxysilane and the like, and optionally, alkoxysilanes, such as methyltrimethoxysilane, dimethyldimethoxysilane and the like, are subjected to at least partial hydrolysis and condensation in the presence of acids. Alternatively, there may be mentioned a process of the co-addition of acrylglycidyl ether or 1-vinyl-3,4-epoxycyclohexane and vinylmethoxysilane to methylphenylhydrogenpolysiloxane at the hydrosilyl groups thereof. Still alternatively, there may be mentioned a process wherein part of residual silanols of methylphenylpolysiloxane is subjected to de-methanolization reaction with γ-glycidoxypropyltrimethoxysilane or the like. The silicone resins are not limited to those resins which are prepared by the processes set out above.

The vinyl polymers which should have groups reactive with the epoxy group are used as the ingredient (B) in the composition of the invention. The vinyl polymers should preferably be carboxyl group-containing vinyl polymers, carboxylic anhydride group-containing vinyl polymers, amino group-containing vinyl polymers and copolymers of two or more monomers for these polymers. These polymers and copolymers may be used singly or in combination. These polymers and copolymers may be prepared by known processes of polymerizing or copolymerizing carboxylic anhydride group and/or carboxyl group or amino group-containing vinyl monomers.

Typical examples of the carboxyl group-containing vinyl monomers include acrylic acid, methacrylic acid, crotonic acid, cinnamic acid, itaconic acid, maleic acid, mono-n-butyl maleate, mono-n-butyl fumarate and the like. Typical examples of the carboxylic anhydride group-containing vinyl monomer include maleic anhydride, itaconic anhydride and the like.

Typical examples of the amino group-containing vinyl monomers include: various dialkylaminoalkyl(meth)acrylates such as dimethylaminoethyl(meth)acrylate, diethylaminoethyl(meth)acrylate, dimethylaminopropyl(meth)acrylate and diethylaminopropyl (meth)acrylate; N-dialkylaminoalkyl(meth)acrylamides such as N-dimethylaminoethyl(meth)acrylamide, N-diethylaminoethyl(meth)acrylamide, N-dimethylaminopropyl(meth)acrylamide and N-diethylaminopropyl(meth)acrylamide; and t-butylaminoethyl(meth)acrylate, t-butylaminopropyl(meth)acrylate, aziridinylethyl(meth)acrylate, pyrrolidinylethyl(meth)acrylate, piperidinylethyl(meth)acrylate and the like.

These carboxyl group, carboxylic anhydride group or amino group-containing vinyl monomers may be copolymerized with other copolymerizable vinyl monomers.

Examples of other copolymerizable vinyl monomers include various (meth)acrylates such as methyl(meth)acrylate, ethyl(meth)acrylate, n-propyl(meth)acrylate, iso-propyl(meth)acrylate, n-butyl(meth)acrylate, iso-butyl(meth)acrylate, tert-butyl(meth)acrylate, 2-ethylhexyl(meth)acrylate, lauryl(meth)acrylate, cyclohexyl(meth)acrylate, benzyl(meth)acrylate, 2-hydroxyethyl(meth)acrylate, 2-hydroxypropyl(meth)acrylate, 2-hydroxybutyl(meth)acrylate and 4-hydroxybutyl(meth)acrylate, and dialkyl esters of unsaturated dibasic acids such as dimethyl maleate, dimethyl fumarate, dibutyl fumarate and dimethyl itaconate.

For the preparation of the vinyl polymers from these monomers, 1 to 100 wt %, preferably 5 to 50 wt %, of carboxylic anhydride group and/or carboxyl group or amino group-containing vinyl monomer and, correspondingly 99 to 0 wt %, preferably 95 to 50 wt %, of other copolymerizable vinyl monomers are polymerized or copolymerized by a usual manner.

For the polymerization or copolymerizaton, any known polymerization processes may be used, of which a solution radical polymerization process is preferred.

Typical of solvents used for the solution radical polymerization include: hydrocarbons such as toluene, xylene, cyclohexane, n-hexane and octane; alcohols such as methanol, ethanol, iso-propanol, n-butanol, iso-butanol, sec-butanol, ethylene glycol monomethyl ether (cellosolve) and the like; esters such as methyl acetate, ethyl acetate, n-butyl acetate and amyl acetate; and ketones such as acetone, methyl ethyl ketone, methyl isobutyl ketone and cyclohexanone. These may be used on their own or in combination.

In the solution radical polymerization process, azide or peroxide radical polymerization initiators which are known in the art are used, in addition to these solvents, for performing the polymerization or copolymerization by a usual manner. If necessary, chain transfer agents such as lauryl mercaptan, octyl mercaptan, dodecyl mercaptan, 2-mercaptoethanol, octyl thioglycolate, 3-mercaptopropionic acid, and α-methylstyrene dimer, may be used as a molecular weight modifier.

The ingredient (C) of the invention is a catalyst for condensation of the silicone resin. Typical examples of the catalyst include basic compounds such as lithium hydroxide, sodium hydroxide, calcium hydroxide, sodium methylate, sodium acetate, sodium formate, n-hexylamine, tributylamine, diazabicycloundecene, 3-aminopropyltriethoxysilane, aminoethylaminopropyltrimethoxysilane and the like, metal-containing compounds such as tetraisopropyl titanate, tetrabutyl titanate, aluminium triisobutoxide, aluminium triisopropoxide, aluminium acetylacetonate, tin octylate, lead octylate, cobalt octylate, dibutyltin diacetate, dibutyltin dioctoate, dibutyltin dilaurate and dibutyltin maleate, and acidic compounds such as p-toluenesulfonic acid, trichloroacetic acid, phosphoric acid, monoalkyl phosphates, dialkyl phosphates, monoalkyl phosphites, monoalkyl phosphonates, dialkyl phosphites and dialkylphosphonates.

In order to obtain the curable resin composition according to the invention using the above ingredients (A) to (C), the ingredients (A) and (B) are formulated in such a way that the epoxy group in the ingredient (A) is in the range of 0.2 to 10 equivalents per unit equivalent of the total reactive groups such as the carboxyl group, carboxylic anhydride and amino groups contained in the ingredient (B). The ingredient (C) is added in an amount of 0.005 to 5 wt % based on the ingredient (A).

The curable resin composition of the invention may be dissolved in known solvents, if necessary, and applied onto various substrates by any known coating techniques, followed by drying or baking at a temperature of room temperature to 250° C., preferably from 60° to 200° C., for a time of 10 to 360 minutes. As a result, a cured coating or film which is resistant to acid is formed on the substrate.

The substrates may be various types of metal substrates and metal processed articles, wood articles, stone articles, slates, tiles, mortars, ceramic articles, plastic articles, organic resin coated products and the like.

When cured, the curable resin composition of the invention is capable of yielding a high strength cured film or coating wherein the resins are mutually, strongly crosslinked and siloxane network is formed on or in the surface layer of the film, thereby significantly improving the acid resistance.

The present invention is described in more detail by way of examples, which should not be construed as limiting the invention thereto. In the examples, parts are by weight.

Reference A: Preparation of epoxy group and hydrolyzable silyl group-containing methylphenylsiloxane.

100 parts of $(H(Me)_2SiO_{1/2})_3(M_e)_2SiO)(_ePh)_2SiO)((Ph)SiO_{3/2})$ wherein Me represents methyl and Ph represents phenyl, 0.5 parts of potassium acetate, and 0.1 part of a 2 wt % chloroplatinic acid toluene solution were charged into a reactor equipped with an agitator, a thermometer, a reflux condenser and a nitrogen-introducing pipe, in which 38 parts of acrylglycidyl ether and 26 parts of vinyltrimethoxysilane were successively dropped at 70° C., followed by keeping at 70° C. for 2 hours. After confirmation of the disappearance of the SiH group, the reaction mixture was cooled down.

The excess of the vinyltrimethoxysilane was removed under reduced pressure to obtain a compound having an epoxy equivalent of 490 and a viscosity of 25 centistokes. This compound is hereinafter referred to simply as compound (A).

Reference B-1: Preparation of carboxyl group-containing polymer.

50 parts of xylene and 70 parts of iso-butyl alcohol were charged into a reactor of the type as used in Reference A and heated to 110° C. Thereafter, a mixture of 20 parts of styrene, 40 parts of methyl methacrylate, 20 parts of n-butyl acrylate, 20 parts of methacrylic acid, 0.5 parts of azobisisobutyronitrile and 20 parts of xylene was dropped in the reactor over 3 hours.

After completion of the dropping, the reaction mixture was maintained at 110° C. for 2 hours, in which a mixture consisting of 0.5 parts of azobisisobutyronitrile, 7 parts of xylene and 7 parts of isobutanol was dropped in 1 hour, followed by keeping the temperature at 110° C. for further 12 hours, thereby obtaining a polymer which had a non-volatile matter of 40 wt % and a number average molecular weight of about 10,000. This polymer was referred to simply as Polymer (B-1).

Reference B-2: Preparation of carboxyl group and carboxylic anhydride group-containing vinyl polymer.

The general procedure of Reference B-1 was repeated except that in Reference B-1 20 parts of methacrylic acid was used, 10 parts of which was replaced by 10 parts of maleic anhydride, thereby obtaining carboxyl group and carboxylic anhydride group-containing polymer. This polymer is hereinafter referred to simply as Polymer (B-2).

Reference B-3: Preparation of amino group-containing vinyl polymer.

The general procedure of Reference B-1 was repeated except that 20 parts of methacrylic acid was replaced by 20 parts of dimethylaminoethyl acrylate, thereby obtaining an amino group-containing Vinyl polymer. This polymer is hereinafter referred to simply as Polymer (B-3).

Examples 1 to 3 and Comparative Example 1.

The compositions of the formulations indicated in Table 1 were each applied onto a cold-finished mild steel sheet (spcc-B) by mans of a bar coater No. 36 and air-dried for 30 minutes, followed by heating at 150° C. for 30 minutes to obtain a cured film on the steel sheet.

The resultant films were each subjected to measurements of the thickness and pencil hardness and further subjected to a spot test wherein one drop of a 1.0% sulfuric acid solution was dropped on each film and allowed to stand at 70° C. for 30 minutes to evaluate its appearance. The results are shown in Table 1 wherein the results of the spot test were assessed as good when no trace of the drop was recognized and as poor when some trace was recognized.

TABLE 1

|  | Example 1 | Example 2 | Example 3 | Comparative Example 1 |
| --- | --- | --- | --- | --- |
| (A) | 113.8 | 156.9 | 62.3 | — |
| (B-1) | 250 | — | — | 250 |
| (B-2) | — | 250 | — | — |
| (B-3) | — | — | 250 | — |
| Dibutyltin diacetate | 0.25 | 0.25 | 0.25 | 0.25 |
| γ-Glycidoxy-propyltrimethoxysilane | — | — | — | 47.8 |
| Film thickness (μm) | 20 | 21 | 20 | 20 |
| Pencil hardness | 2H | 3H | 2H | H |
| Acid resistance | good | good | good | poor |

Comparative Example 2

100 parts of a solid resin consisting of a hydrolyzate of methyltrimethoxysilane (having a viscosity of 10 centistokes at 25° C. in the form of a 50 wt % solution in toluene with an amount of the hydroxyl group of 5 wt % and an amount of the methoxy group of 5 wt %) were agitated at room temperature for 18 hours along with 20 parts of γ-glycidoxypropylmethyldiethoxysilane, 0.1 part of $(i-C_4H_9)Al(ethyl\ acetate)$ (commercially available from Hope Seiyaku K. K. under the designation of ACS) and 100 parts of toluene, followed by distilling off the solvent under a reduced pressure of 10 mmHg at 120° C. in one hour.

100 parts of the resultant compound were mixed with 40 parts of Polymer (B-1) and 0.1 part of dibutyltin acetate but were not compatible therewith.

What is claimed is:

1. A curable resin composition which consists essentially of:

(A) a silicone resin having epoxy and phenyl groups and at least two hydrolyzable groups selected from the group consisting of a silyl group, a silanol group and mixtures thereof in the molecule;

(B) a vinyl polymer having at least one group reactive with the epoxy group of the silicone resin and selected from the group consisting of carboxyl group-containing vinyl polymers, carboxylic anhydride group containing vinyl polymers, amino group-containing vinyl polymers and copolymers of two or more monomers for the polymers whereby said at least one group is a carboxyl group, a carboxylic anhydride group, and amino group or a mixture thereof; and (C) a condensation catalyst for the hydrolyzable groups of the silicone resin, wherein the silicone resin and the vinyl polymer are present in such amounts that the epoxy group in the silicone resin is in the range of 0.2 to 10 equivalents per unit equivalent of the at least one group reactive with the epoxy group and the condensation catalyst is present in an amount of from 0.005 to 5 wt. % of the silicone resin.

2. A curable resin composition according to claim 1, wherein said silicone resin is of the following general average formula

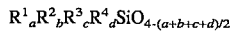

wherein $R^1$ represents an epoxy group-containing organic group having from 6 to 14 carbon atoms, $R^2$ represents a group selected from the group consisting of a hydrolyzable silyl group-containing organic group, OH group and mixtures there, $R^3$ represents a phenyl group, $R^4$ represents a methyl group, an ethyl group or a propyl group, and a, b, c and d are, respectively, a value to satisfy the requirements that $0<a+b+c+d\leq 2$, $0<a<1.5$, $0<b<1.5$, $0<c<1.5$ and $0\leq d<1.5$.

3. A curable composition according to claim 1, wherein said epoxy group is a member selected from the group consisting of a glycidoxypropyl group and 2-(3',4'-epoxycyclohexyl)ethyl group.

4. A curable composition according to claim 1, wherein said at least two hydrolyzable groups are of the following general formula, $—Si(R^5)_e-R^6_{3-e}$, wherein $R^5$ represents a hydrogen atom or a monovalent organic group having from 1 to 10 carbon atoms, $R^6$ represents a hydrogen atom, a halogen atom, an alkoxy group having from 1 to 4 carbon atoms, an acyloxy group having from 2 to 4 carbon atoms, a phenoxy group, an iminoxy group or an alkenyloxy group having from 2 to 6 carbon atoms, and e is a value of 0,1 or 2.

5. A curable composition according to claim 1, wherein said at least two hydrolyzable groups are of the formula, $—Si(OCH_3)_3$.

6. A curable composition according to claim 1, wherein said silicone resin has a weight average molecular weight of not smaller than 1000.

7. A curable composition according to claim 1, wherein said phenyl group in said silicone resin is present in an amount of not less than 3 mole %.

8. A cured product of the composition of claim 1.

* * * * *